(12) United States Patent
Signori

(10) Patent No.: US 7,877,845 B2
(45) Date of Patent: Feb. 1, 2011

(54) CONTROLLED-RELEASE FASTENING DEVICE

(75) Inventor: Dino Signori, Maser (IT)

(73) Assignee: Sidi Sport S.R.L., Maser (TV) (IT)

( * ) Notice: Subject to any disclaimer, the term of this patent is extended or adjusted under 35 U.S.C. 154(b) by 505 days.

(21) Appl. No.: 11/954,915

(22) Filed: Dec. 12, 2007

(65) Prior Publication Data
US 2009/0151508 A1 Jun. 18, 2009

(51) Int. Cl.
*A43C 11/14* (2006.01)
(52) U.S. Cl. .................................... 24/68 SK
(58) Field of Classification Search ............... 24/68 SK, 24/70 SK, 71 SK, 69 SK; 36/50.1, 50.5; 254/237, 247
See application file for complete search history.

(56) References Cited
U.S. PATENT DOCUMENTS

| | | | | | |
|---|---|---|---|---|---|
| 5,575,045 | A | * | 11/1996 | Chu | 24/68 SK |
| 5,606,779 | A | * | 3/1997 | Lu | 24/68 SK |
| 5,642,555 | A | * | 7/1997 | Lin | 24/70 SK |
| 5,745,959 | A | * | 5/1998 | Dodge | 24/68 SK |
| 2002/0189056 | A1 | * | 12/2002 | Gallina et al. | 24/68 R |

FOREIGN PATENT DOCUMENTS

| | | |
|---|---|---|
| EP | 1611811 A1 | 1/2006 |
| FR | 2750832 A1 * | 1/1998 |
| IT | PN2004U000013 | 7/2004 |
| WO | WO 2006109903 A1 * | 10/2006 |

* cited by examiner

*Primary Examiner*—James R Brittain
(74) *Attorney, Agent, or Firm*—Volpe and Koenig, P.C.

(57) ABSTRACT

A controlled-release fastening device including a toothed strap with pitched toothing, a base on which is mounted at least one main hook pivotal with respect to the base between a retaining position, in which the hook is selectively engaged between contiguous teeth of the toothing in order to hold the strap in one direction with respect to the base, and a release position, in which at least one hook is disengaged from the strap, allowing the sliding thereof relative to the base. A ratchet is mounted on the base for the gradual release of the strap by one or more teeth at a time. The ratchet including a first and a second hook mutually spaced by a non-integral multiple of the toothing pitch and capable of alternately engaging the toothing during controlled release of the strap. The first hook of the escapement ratchet mechanism coincides with the main hook and the second hook is structurally independent of the first hook, hinged on the base coaxially with the first hook and operationally connected to the first hook in order to disengage it from the toothing of the strap when the second hook is engaged therein and vice versa.

10 Claims, 2 Drawing Sheets

CONTROLLED-RELEASE FASTENING DEVICE

FIELD OF INVENTION

The subject of the invention is a controlled-release fastening device, particularly, although not exclusively, arranged for use on sports footwear.

BACKGROUND

A device provided with such characteristics is known for example from Italian Utility Model Application PN2004U000013.

In the technical field of sports footwear, including in particular cycling footwear, there is a need to adjust the fastening tension rapidly, even while in motion. This adjustment, with particular reference to the closure of the instep region of the footwear, where this locks on the back of the foot, serves adequately to address specific pedalling circumstances, different for example when pedalling uphill from when pedalling on the flat or downhill.

The adjustment must allow maximum clamping of the foot without however causing soreness. To this end, various devices have been developed which make it possible to carry out such adjustment, starting from a state of complete clamping of the foot, by releasing the toothed strap a little at a time. These mechanisms, including that described in the patent application cited previously, have some drawbacks however, not least the fact that the closeness of the controls for controlled release and total release may lead to the accidental total release of the fastening. Furthermore, the total release of the fastening, when obtained by pressing the corresponding push-button towards the base, may be hindered or even blocked in the presence of mud or dirt between the fastening and the strap.

A further drawback arises from the fact that the hooking means of the ratchet is not hinged directly on the base, and this may entail possible malfunctions under load.

The problem underlying the present invention is that of providing a fastening device structurally and functionally designed so as to remedy all the drawbacks mentioned with reference to the prior art cited.

SUMMARY

This problem is solved by the invention by a fastening device including a toothed strap with pitched toothing, a base on which is mounted at least one main hook pivotal with respect to the base between a retaining position, in which the hook is selectively engaged between contiguous teeth of the toothing in order to hold the strap in one direction with respect to the base. There is a release position in which the at least one hook is disengaged from the strap, allowing the sliding thereof relative to the base. A ratchet having an escapement ratchet mechanism mounted on the base for the gradual release of the strap by one or more teeth at a time, the ratchet including a first and a second hook mutually spaced by a non-integral multiple of the toothing pitch and capable of alternately engaging the toothing during controlled release of the strap. The first hook of the escapement ratchet mechanism coincides with the main hook and the second hook is structurally independent of the first hook, hinged on the base coaxially with the first hook and operationally connected to the first hook in order to disengage it from the toothing of the strap when the second hook is engaged therein and vice versa.

BRIEF DESCRIPTION OF THE DRAWINGS

The characteristics and advantages of the invention will become clearer from the detailed description of a preferred but not exclusive exemplary embodiment thereof, illustrated by way of non-limiting example with reference to the appended drawings, in which.

DETAILED DESCRIPTION OF THE PREFERRED EMBODIMENTS

Figure 1:
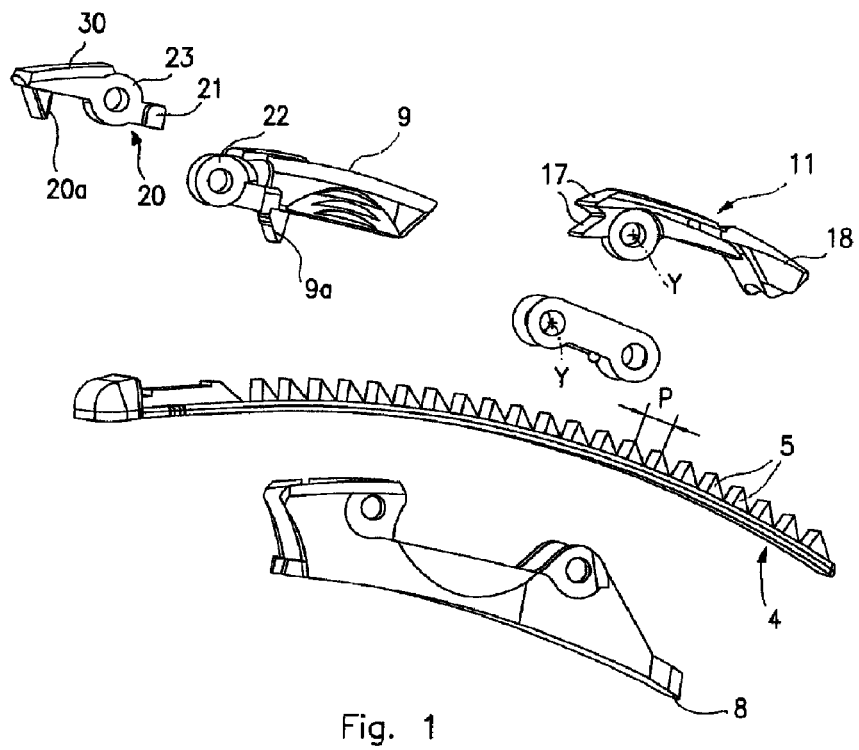
FIGS. 1 and 2 are perspective exploded views of a device produced according to the present invention.
Figure 2:
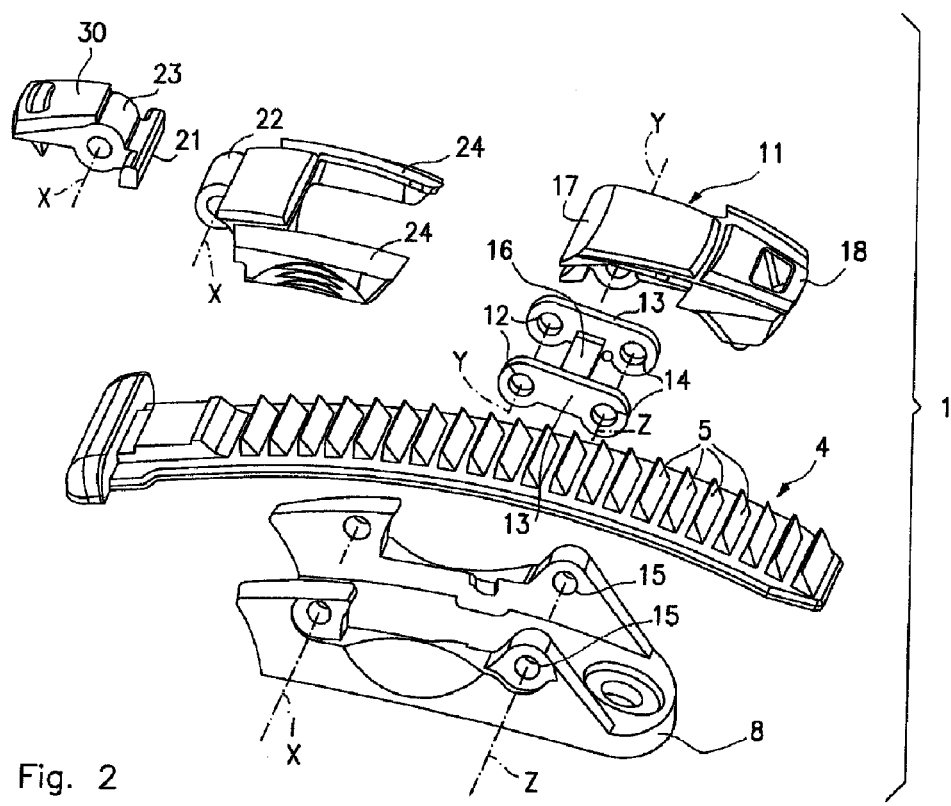

In the drawings, the reference 1 indicates as a whole a fastening device produced according to the present invention.

The device 1 comprises a toothed strap 4 with toothing formed by equidistant teeth 5 of pitch P, and a controlled-release retaining member 7 in which the strap 4 is removably and adjustably engaged in the manner which will be clarified hereinafter.

Figure 3:
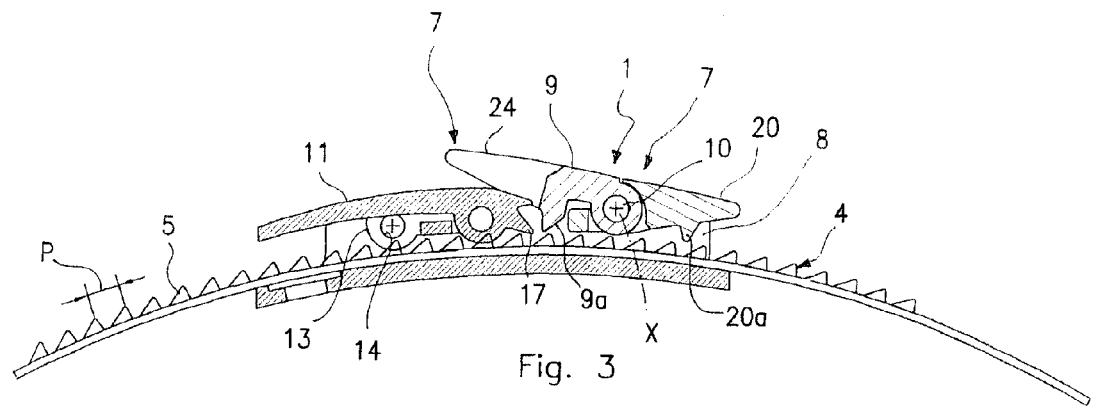
FIGS. 3 to 5 are diagrammatic views in longitudinal section of the device of FIGS. 1 and 2 in different operating phases: respectively total release of the strap, step-by-step adjustment of same, and the working phase.
Figure 4:
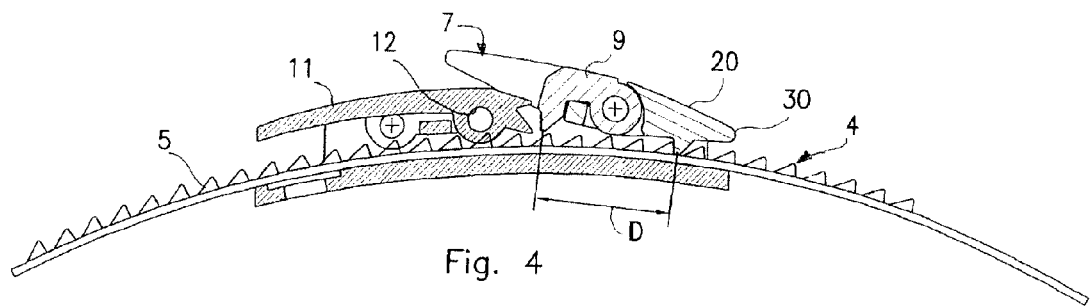
Figure 5:
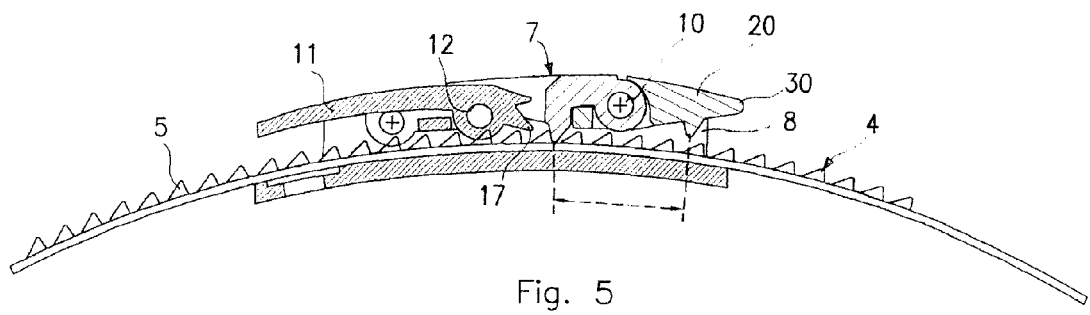

The retaining member 7 itself includes a base 8 on which is mounted a main hook 9 pivotal with respect to the base 8 about a pin 10 with axis X, between a retaining position (FIG. 5) in which a retaining tooth 9a of same is selectively engaged between contiguous teeth 5 of the toothing in order to hold the strap 4 in one direction with respect to the base, and a release position (FIG. 3) in which the retaining tooth 9a is disengaged from the strap, allowing it to slide relative to the base.

Also mounted on the base 8 is a feed lever 11 for advancing the strap 4. The feed lever 11 is hinged about an axis Y in holes 12 provided at a corresponding end of a pair of connecting rods 13, the opposite end of which is provided with further holes 14 with which the connecting rods are hinged to the base 8 at third holes 15 with axis Z.

The connecting rods 13 are fixed to each other via a cross-member 16.

The feed lever 11 is provided with feed teeth 17 opposed to an operating appendage 18 for entraining the strap 4 in the feed direction, which is that not opposed by the main hook 9.

The main hook 9 also co-operates with a second hook 20, having a retaining tooth 20a, and also hinged on the base 8 via the pin 10, in order jointly to form an escapement ratchet mechanism for the controlled release of the strap for one or more teeth at a time.

The retaining teeth 9a, 20a of the hooks 9 and 20 are mutually spaced by a distance D, the measurement of which is a non-integral multiple of the toothing pitch, such that for the controlled release of the strap they alternately engage the toothing, releasing the strap by a fraction of the pitch between the teeth when the first of the hooks engages the toothing, and by the remaining fraction of the pitch when the first hook is disengaged and the second is engaged.

The main hook 9, or first hook of the escapement ratchet mechanism, is structurally independent of the second hook although both are mounted on the same pin 10. They are operationally connected to each other in order that the second hook 20 disengages the first hook 9 from the toothing of the strap when the second hook 20 is engaged therein and vice versa.

The operational connection between the first and the second hook comprises a support 21 integral with the second hook on the opposite side thereof with respect to the hinging axis and to an operating appendage 30. The support 21 is engaged beneath the first hook 9, between this latter and the strap 4, in order to lift it in disengagement from the toothing when the second hook is pressed into engagement with the toothing by acting on the appendage 30.

The hooks 9, 20 each comprise a respective tubular hub 22, 23 for hinging to the base; the hubs 22, 23 are complementary in prolongation of each other to define a single seat for hinging both the hooks. The support 21 extends parallel to the axis X and is spaced therefrom, being integral with the outer wall of the tubular hub 23.

Interposed between the hooks 9, 20 and the base 8 are resilient elements, not shown, urging the first hook into engagement with the toothing of the strap and/or the second hook 20 into disengagement therefrom.

For the actuation of the first hook 9 for total release of the strap, it is provided with a pair of operating appendages 24 co-extending and mutually spaced from each other to lie alongside the feed lever, which is therefore at least partly contained between them. It should be noted that the operating appendages 24, 30 of both the hooks extend from the same side of the respective retaining teeth 9a, 20a with respect to the hinging axis X, such that the operational actuation for disengaging the hooks from the toothing of the strap includes in all cases the distancing of the corresponding operating appendages from the base. This means that an accidental pressure on the operating appendages, which may occur in the event of an impact, entails at most a gradual release of one pitch of the strap, but not the complete release of same.

The operation of the device 1 is as follows.

Starting from a normal operating state in which the hook 9 is urged by the resilient means into engagement with the toothing of the strap, actuating the feed lever to pivot on its own axis effects the feed of the strap with consequent skipping of the first hook 9 on the toothing, little by little as this toothing is advanced, as a result of the sawtooth profile of same.

By pivoting the main hook 9 about its axis X, however, the total release of the fastening is obtained, with the consequent possibility of completely disengaging the strap 4.

Starting from a predetermined state of tensioning of the fastening, by repeatedly pressing and releasing the secondary hook 20, however, the gradual step-by-step release of the strap (one tooth at a time) is obtained. Therefore the user, once the fastening is fully tightened, may obtain precise adjustment of the fastening tension simply by repeatedly pressing and releasing the second hook 20 so as to engage it with the toothing of the strap, at the same time disengaging the main hook 9 and then releasing it, but engaging in its turn the main hook 9.

The steady hinging of the escapement ratchet mechanism on the base prevents the mechanism from being subjected to displacements and deformation under load, therefore solving the problem posed. The distance between the operating appendages of the hooks prevents them from being confused and/or actuated accidentally, rendering the operation of the fastening device safe and efficient.

The solution proposed offers the advantage that the total release of the fastening device and the gradual, adjusting, release, take place with two different and opposed actions which respectively entail the lifting of the operating appendages of the main hook and, on the other hand, the lowering of the operating appendage of the second hook, avoiding confusion for the user. Moreover, the fact that the control for total release of the strap involves the lifting of the operating appendage of the hook avoids jamming in the presence of mud or dirt. Last but not least is the fact that in the case of an accidental impact against the operating appendages of the hooks, at maximum a controlled release of one tooth of the strap occurs and not the total release thereof.

The invention claimed is:

1. A controlled-release fastening device comprising: a toothed strap with pitched toothing, a base on which is mounted at least one main hook pivotal with respect to the base between a retaining position, in which the hook is selectively engaged between contiguous teeth of the toothing in order to hold the strap in one direction with respect to the base, and a release position in which said at least one hook is disengaged from the strap, allowing the sliding thereof relative to the base, a ratchet, comprising an escapement ratchet mechanism, being mounted on the base for the gradual release of said strap by one or more teeth at a time, said escapement ratchet mechanism including a first and a second hook mutually spaced by a non-integral multiple of the toothing pitch and capable of alternately engaging the toothing during controlled release of the strap, wherein said first hook of the escapement ratchet mechanism coincides with the main hook, and the second hook is structurally independent of the first hook, hinged on said base coaxially with the first hook and operationally connected to the first hook in order to disengage it from the toothing of the strap when the second hook is engaged therein and vice versa.

2. A device according to claim 1, wherein the operational connection between the first and the second hook comprises a support fixed to the second hook on the opposite side thereof with respect to the hinging axis, said support being engaged beneath the first hook, between this latter and the strap, in order to lift it in disengagement from the toothing when the second hook is pressed into engagement with the toothing.

3. A device according to claim 2, wherein said hooks each comprise a tubular hub for hinging to the base, said hubs being complementary in prolongation of each other to define a single hinging seat.

4. A device according to claim 1, wherein said hooks each comprise a tubular hub for hinging to the base, said hubs being complementary in prolongation of each other to define a single hinging seat.

5. A device according to claim 1, wherein resilient means are interposed between said hooks and the base, urging the first hook into engagement with the toothing of the strap and the second hook into disengagement from the toothing.

6. A device according to claim 1 comprising a feed lever for advancing the strap with respect to the base, said feed lever being hinged at one end of a pair of connecting rods, the opposite end of which is hinged to the base.

7. A device according to claim 6, wherein the connecting rods of said pair are fixed to each other via a cross-member.

8. A device according to claim 6, wherein the first hook comprises an operating appendage extending partially alongside said lever.

9. A device according to claim 8, wherein said first hook comprises two operating appendages co-extending and mutually spaced, and said feed lever is at least partly contained between said appendages.

10. A device according to claim 1, wherein both said main and second hooks are equipped with operating appendages and respective retaining teeth arranged on the same side with respect to the hinging axis, such that the operational actuation for disengaging the hooks from the toothing of the strap includes in all cases the distancing of the corresponding operating appendages from the base.

* * * * *